May 8, 1962 R. G. PRIEST 3,033,526
PORTABLE LOGGING TOWER
Filed Oct. 24, 1955 8 Sheets-Sheet 4
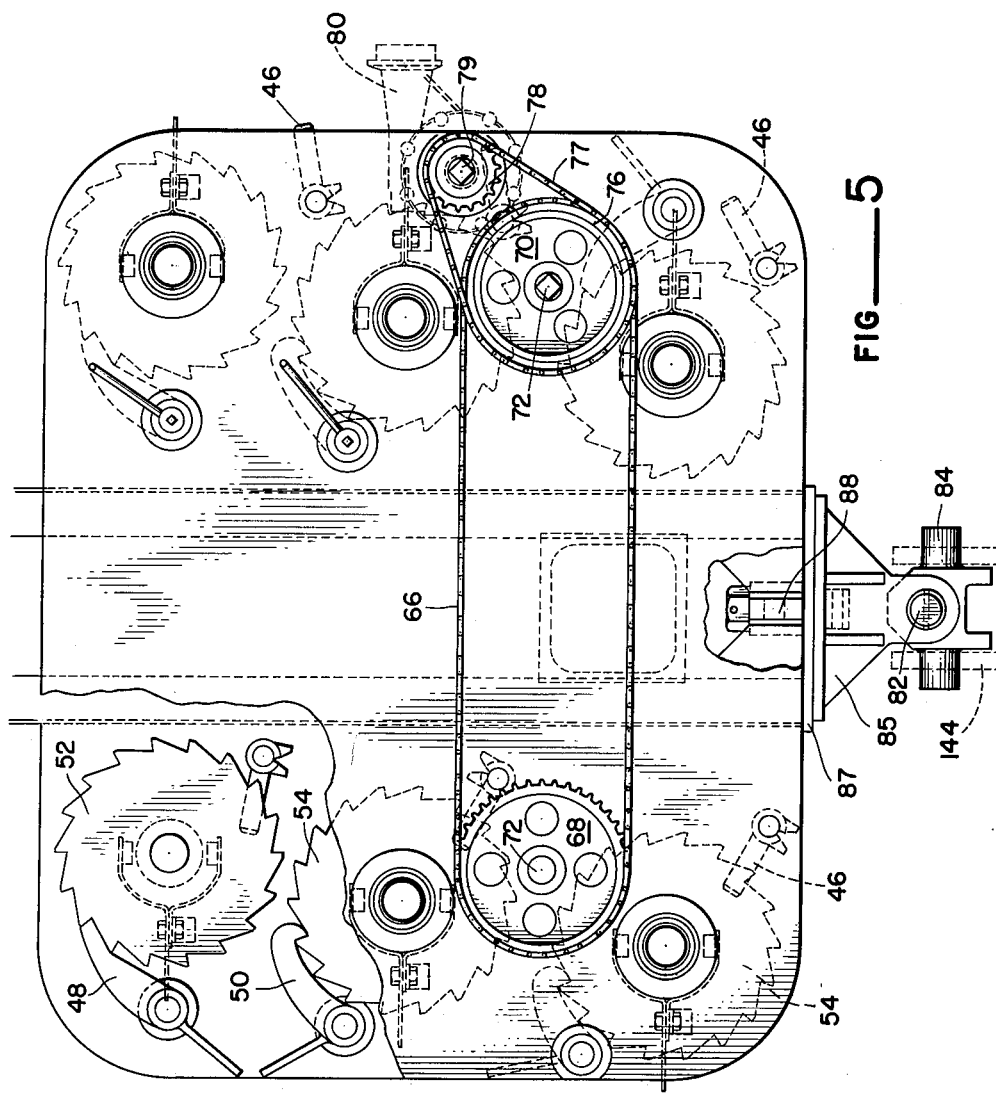
FIG—5
REID G. PRIEST
*INVENTOR.*
BY
*Smith & Tuck*

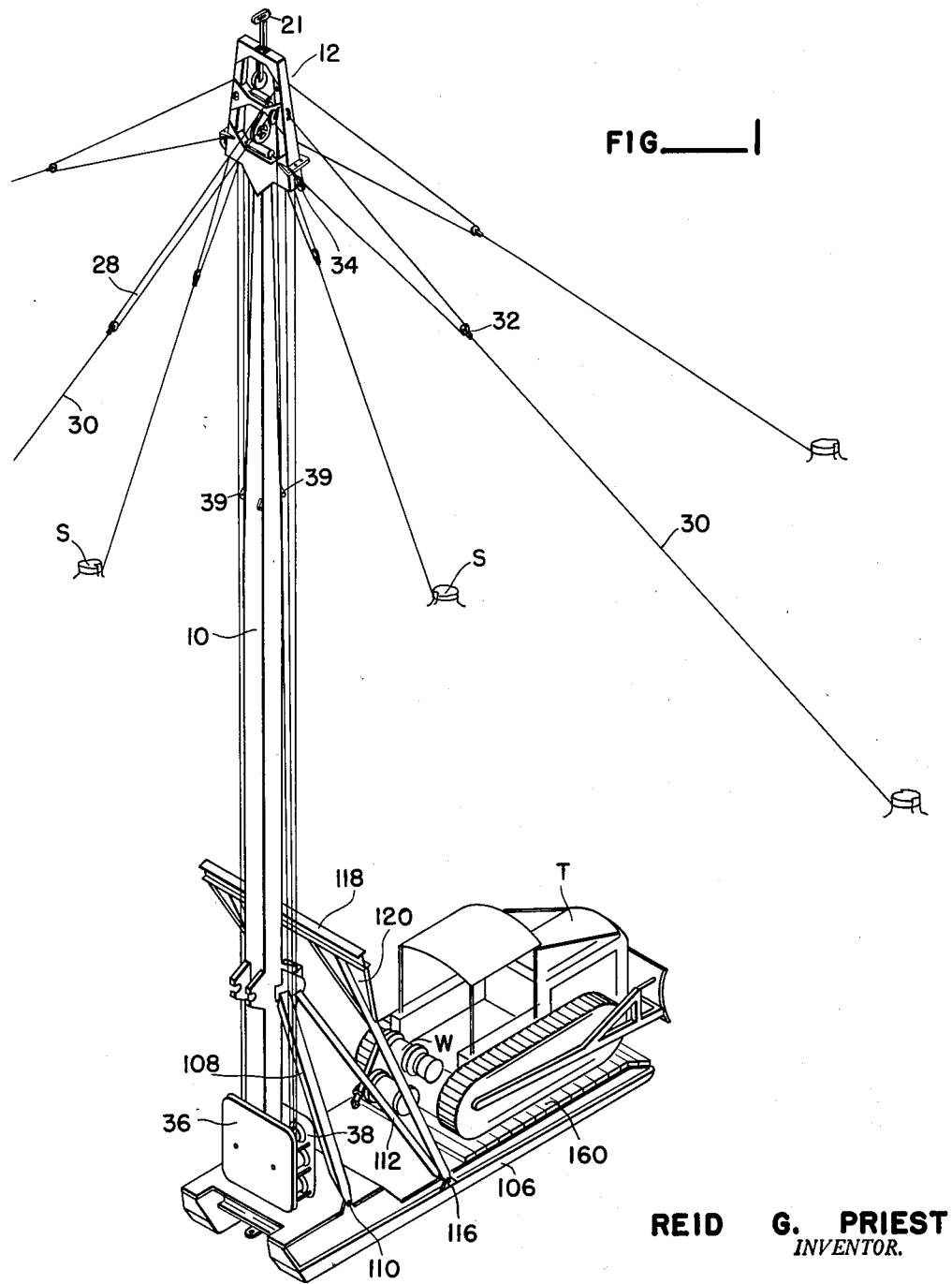

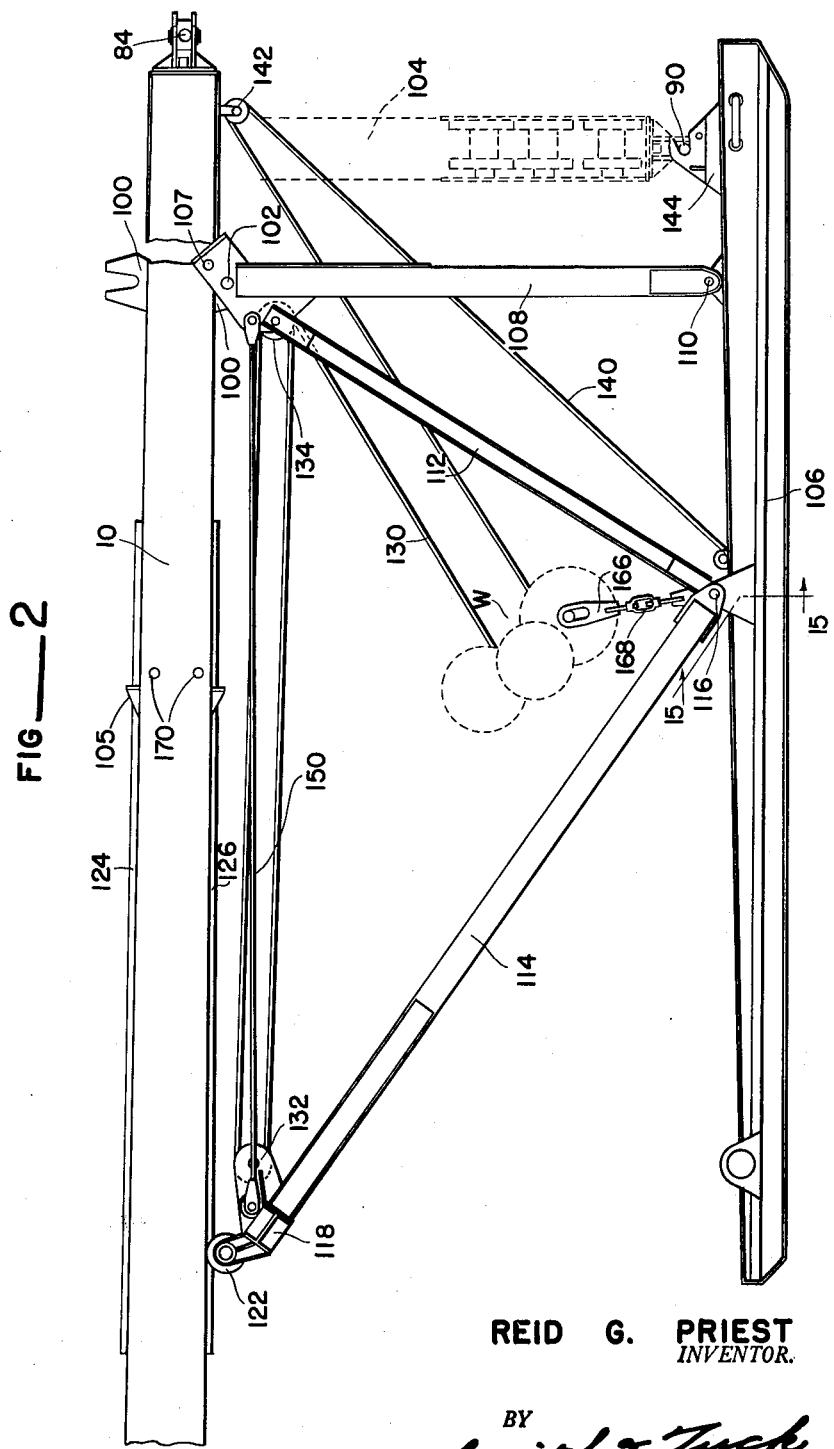

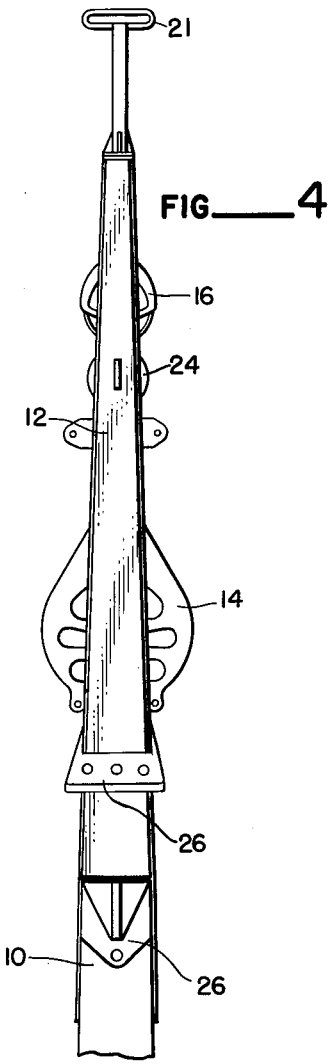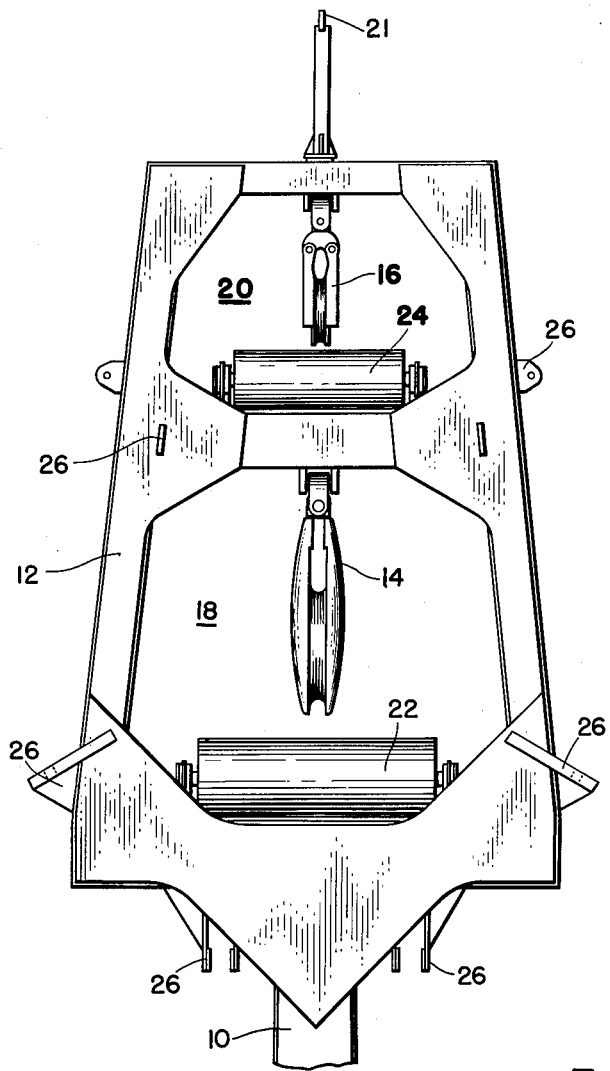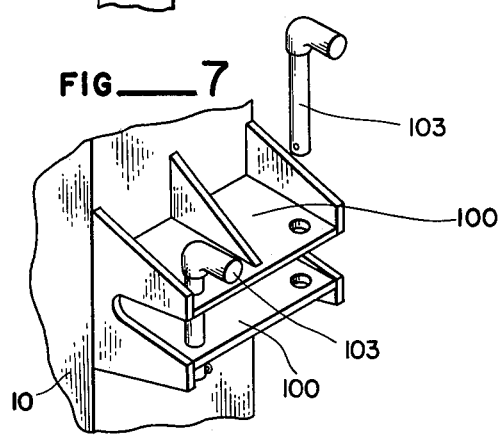

May 8, 1962   R. G. PRIEST   3,033,526
PORTABLE LOGGING TOWER
Filed Oct. 24, 1955   8 Sheets-Sheet 5
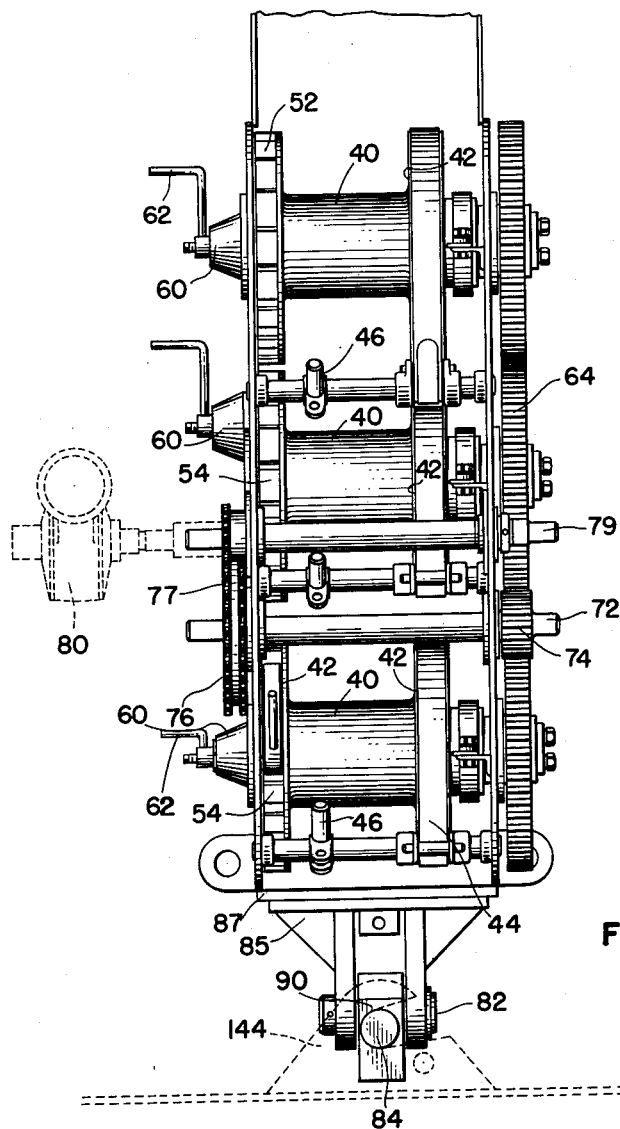
FIG__6
REID G. PRIEST
*INVENTOR.*
BY
*Smith & Tuck*

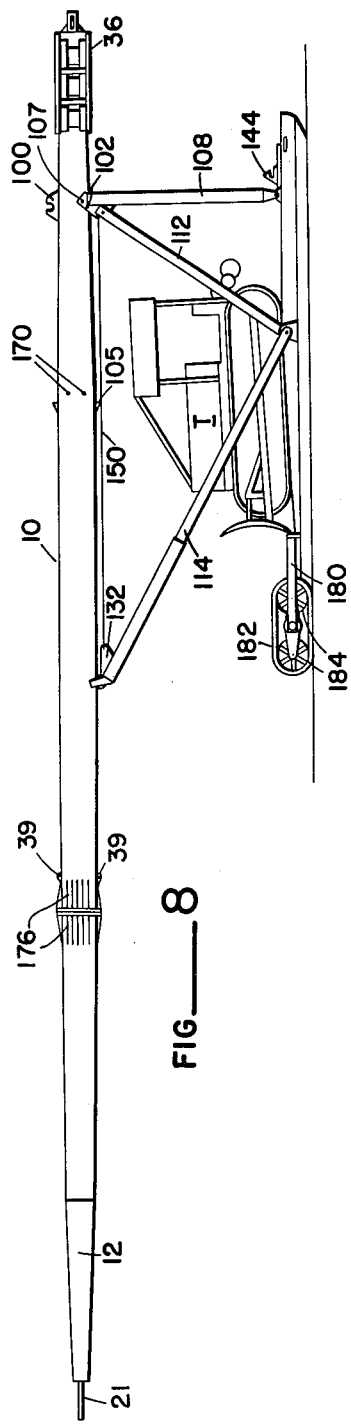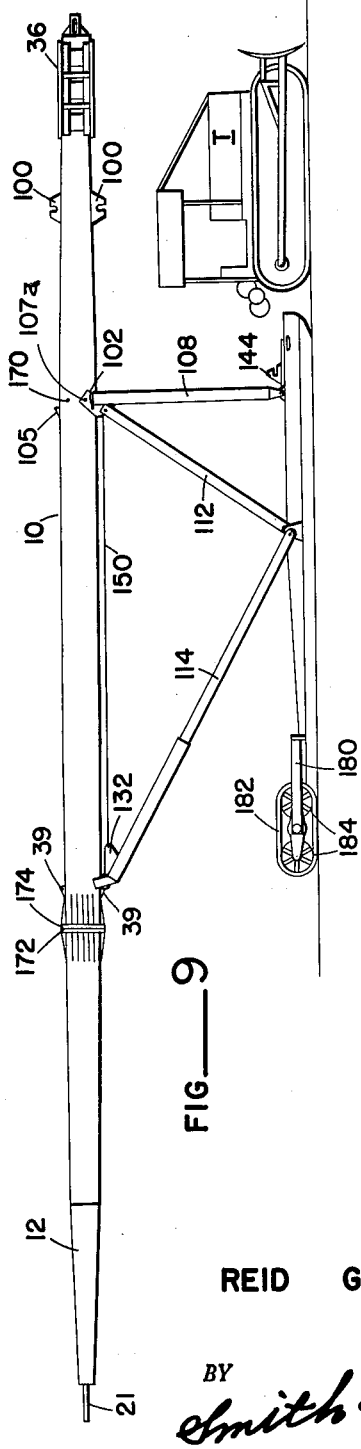

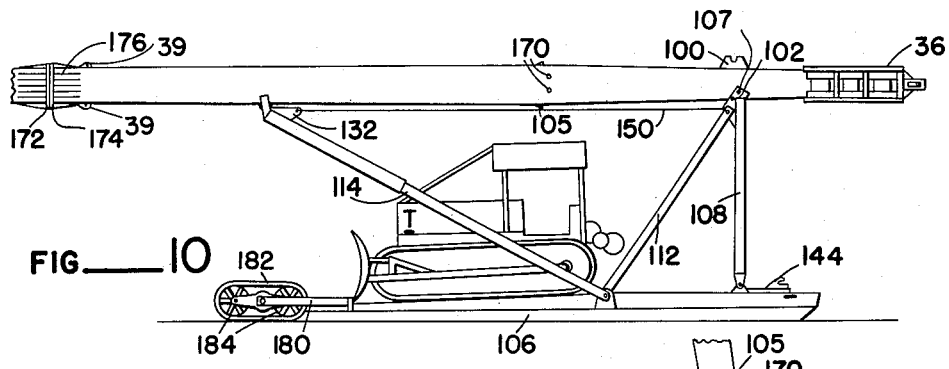
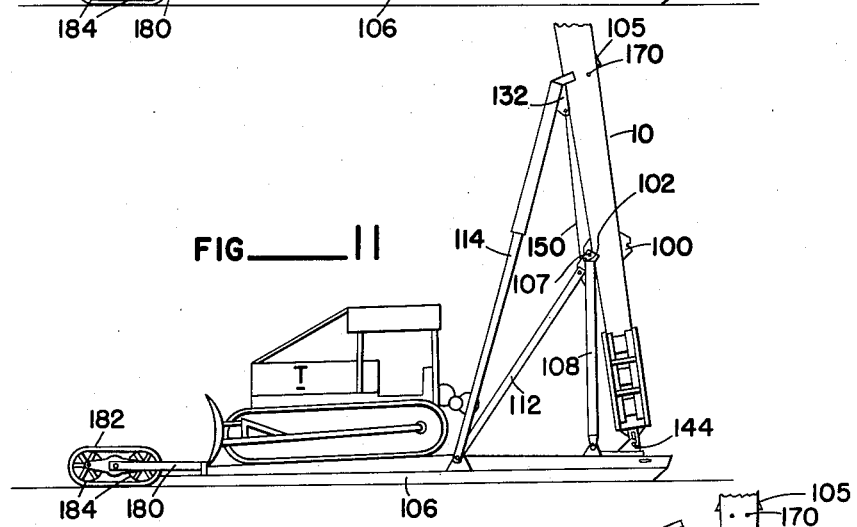
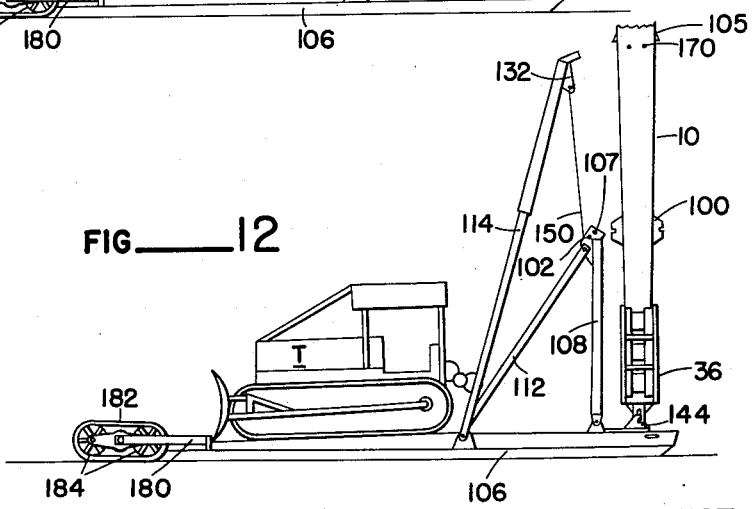

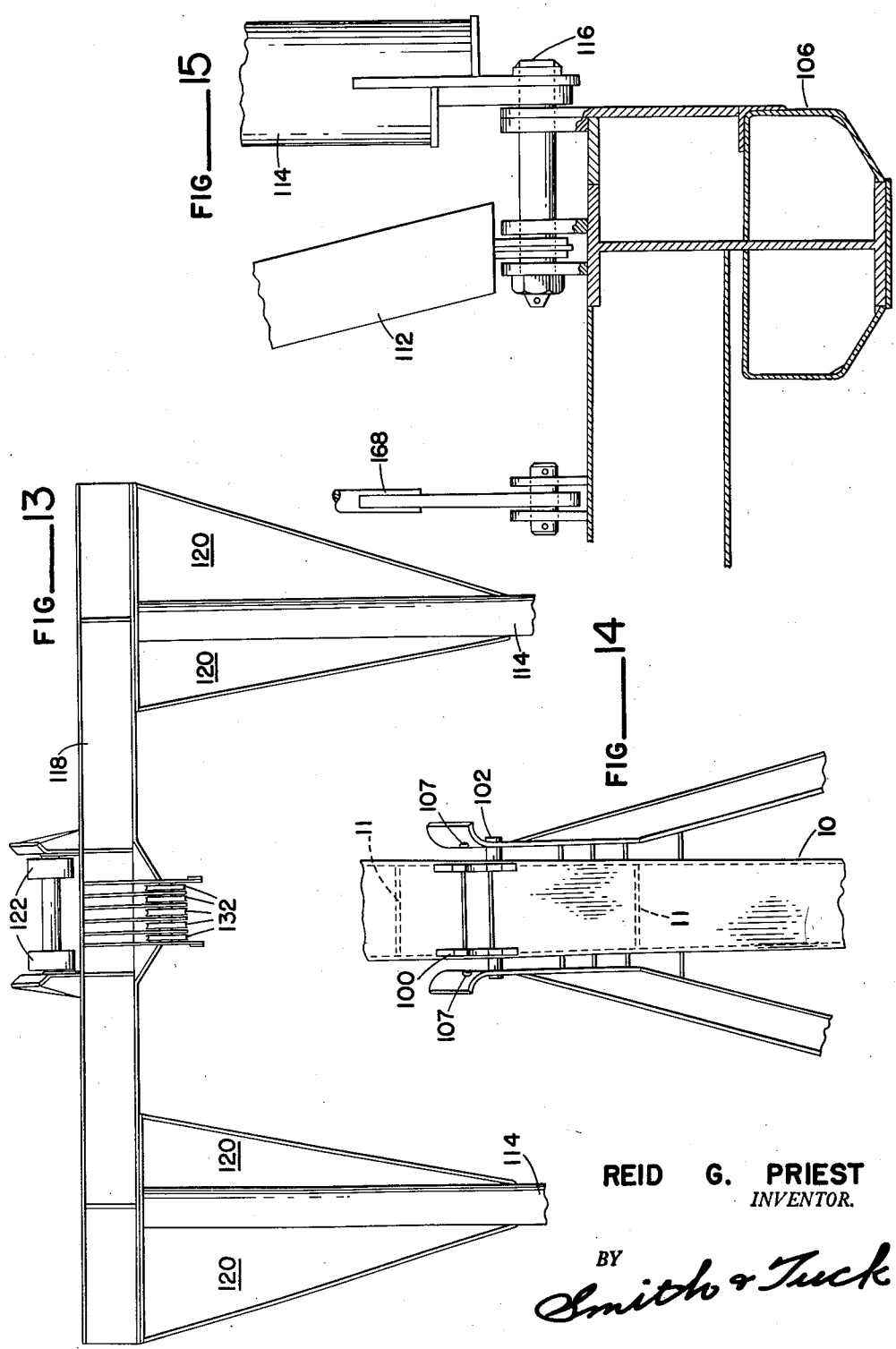

United States Patent Office 3,033,526
Patented May 8, 1962

3,033,526
PORTABLE LOGGING TOWER
Reid G. Priest, 523 Marine Drive, Port Angeles, Wash.
Filed Oct. 24, 1955, Ser. No. 542,341
3 Claims. (Cl. 254—139.1)

This present invention relates to the general class of portable derricks or spars and more particularly to a portable logging tower or spar. It is an unusually high spar normally used in a vertical position and held in this position by a plurality of guys. To transport the device from place to place in a logging area this spar is mounted upon a sled-like base and when in using position, the spar is pivotably secured to the base. In the transport position however, this spar is lowered so that it is substantially horizontal and at some height above the transport or mounting sled. The device is operated by a bulldozer, equipped with a plurality of drums, which transports the device from place to place and also serves as a hoisting engine. During the hoisting operation the bulldozer is driven up on the sled itself to supply additional weight to the base supporting the spar.

This present application is drawn to an improved type of portable logging tower having many of the characteristics of my former application, Serial No. 380,330, filed September 15, 1953 now Patent Number 2,790,622 issued April 30, 1957. Equipment of this order is very desirable under the conditions encountered in logging, especially in mountainous terrane where the trees grow to large sizes and are therefore very difficult to yard by the more conventional bulldozer or bulldozer drawn trailer arrangements. In the past it was quite common to employ spars trimmed on the spot and reduced to a usable height by topping growing trees and then rigging them for logging use. Such an operation, however first required that a tree would be in a suitable position, often times very difficult to achieve, and secondly; a great deal of time was spent in the rigging of the native spar tree. Another shortcoming of the older method of spar tree logging was the fact that the time incidental to re-rigging a yarding site added greatly to the expense of the logging operation in that the entire operation including the transport trucks and the like would be idle during the moving period. In order to minimize waste it was quite common to use long lines of cables in order that a considerable area could be yarded from one location. This introduced many problems which have been overcome with the use of the portable logging tower. With this new equipment changes of location can be made with very little loss of time, consequently, the unit can be moved economically over short distances so that the yarding operation will be a most economical one.

With the present equipment the heretofore enormous investments in equipment have been greatly reduced by, in effect, making use of all the equipment all of the time. With this present equipment this is achieved by providing a transport sled which also serves as the base to which the tower is pivoted when in use. The tower is erected through power supplied by the same bulldozer which moved the equipment and when the tower has been raised to a point where it is substantially vertical but still well under the control of the hoisting mechanism, a plurality of guy lines are run out, normally to existing tree stumps. These guy lines then are provided with their own spooling winches as part of the base of the spar, to the end that the lines are maintained in a position out of the way, thus avoiding interference in the normal functions during the logging period and furthermore, it is possible to very accurately adjust the various guy lines right from the base of the spar. This is a vast improvement over the methods formerly employed and is a very important feature of this present application.

The principal object of this present invention, therefore, is to provide a portable logging tower which provides in one compact unit all the essentials for movement of the device, for erecting or lowering of the spar, for guying the same securely in its position of use, and finally, in providing the power for the complete logging operation.

A further object of this present invention is to provide a portable spar having a banjo head to which is secured, at all times during movement or in use, the main line block, the haul-back block, and to which all the guy line tackles are secured at all times, so that there is no dismantling of any rigging when a move is contemplated and when a move is completed, all of the rigging is in the assembled position ready for immediate use.

A further object of this invention is to provide as part of a spar assembly the necessary winches for handling all of the essential tower guys, so that the unit can be quickly put into use or lowered for transport and when in place immediate adjustment can be made of the tension on the guy lines to correct any settling or misalignment or inclination of the spar or its base.

A further object is to provide means for moving the spar longitudinally, while in the horizontal position, in order to achieve a balanced transport load and to provide securing means for the spar in its balanced position.

A further object is the provision of a unitary spar and guying system that permits the supporting platform and associated equipment to be revolved without revolving the spar.

Further objects, advantages and capabilities will be apparent from the description and disclosure in the drawings, or may be comprehended or are inherent in the device.

In the drawings:

FIGURE 1 is a perspective view showing a unit made after the teachings of this present invention, and showing the principal elements thereof in the normal position of use;

FIGURE 2 is a side elevation, with certain parts broken away or indicated as by dashed lines, showing the equipment of FIGURE 1 in the transport position;

FIGURE 3 is a front elevation of the tower top;

FIGURE 4 is a side elevation of the tower top shown in FIGURE 3;

FIGURE 5 is an illustration with certain parts broken away illustrating the arrangement of the guy tackle winches;

FIGURE 6 is a similar view of the same general parts as shown in FIGURE 5, but with the viewing angle revolved through ninety degrees;

FIGURE 7 is a fragmentary perspective view of the spar securing and pivot means;

FIGURE 8 illustrates the position of the spar as it is lowered to the horizontal position or the position of the spar just prior to raising it to its operational position;

FIGURE 9 indicates the transport position of the spar;

FIGURES 10, 11 and 12 illustrate sequential positions of the spar during the raising operation;

FIGURE 13 is a fragmentary view of the upper end of the spar raising and lowering frame member;

FIGURE 14 is a fragmentary view of a portion of the spar and the upper end of the fixed A frame assembly at the time of their engagement; and FIGURE 15 is a vertical sectional view taken along the line 15—15 of FIGURE 2.

Referring more particularly to the disclosure in the drawings, the numeral 10 designates the spar used as the principal part of this equipment and this is preferably a tapered box section formed of steel and is provided with interior bracing or perforated plates 11 as is shown in FIGURE 14. Considering the fact that a preferred height of this spar above its base is in the neighborhood of eighty-five feet, the spar itself must have very generous factors of safety considered in its design as the bending stress placed on it is considerable. This is especially true when it is considered that each of the six guys tend to put a top loading on the spar. This loading, of course, is additional to the main load placed upon the tower by the haul-in cable which passes through from the drum up over the sheave in the top of the tower and then down to the log.

The tower top 12 is probably best illustrated in FIGURES 3 and 4. The tower top is also preferably fabricated from steel plate so as to provide an adequate support for the main line or haul-in sheave block 14, and the haul-back sheave block 16. Both of these cables operate at relatively high speed and the haul-in cable sheave 14, of course, is subjected to very heavy strains. Both of these blocks, therefore, have been placed in open spaces as 18 and 20, so they have ample clearance for reasonable swiveling and guide rolls as 22 and 24, are provided respectively for these sheaves. Such guide means are very desirable because when under load the blocks employed to house and revolvably support the main line and haul-back sheaves tend to swing outwardly from the top framework as it is only natural that they would seek the median angle between the line going to the load and the other portion of the line going down to the winch drum. It will be noted, particularly in FIGURE 4, that guide roll 24 extends out beyond the outer limits of the framework.

A plurality of attachment lugs are provided as at 26, and to these are normally secured by shackles, the dead ends of the guy tackles 28. It is to be noted in FIGURE 1 that each of the guys is provided with a double purchase tackle, and this is a very desirable arrangement in that the cable guys 30 are single cables which can be disengaged from the tackle blocks 32, and a length appropriate for the location may then be selected. From block 32 the cable 28, which at one end is fixed to the tower top 12 passes through a block, as 34, and then down to its own individual winch drum. As this cable only has half as much strain on it as do the single guys 30, the cable can be correspondingly lighter and the winch that the cable is wound on can be proportionately smaller and still serve its full intended purpose.

A top attachment lug 21 is provided uppermost on the tower for connecting cables for various purposes, i.e., it may be necessary to release part of the other guys during initial adjustment of the position of the tower and during later adjustments for hauling in logs from another direction and lug 21 provides a point of attachment for an extra cable for support.

At the base end of spar 10 and fixedly secured to it, are two banks of winches, each winch having a single drum upon which is wound one of the tackle cables 28. It is desired to point out that it is of great assistance in the handling of this equipment to have the winches, which control the guy cables, all fixedly secured to the spar and at a low level so they can be manually controlled. It is often very desirable to be able to revolve the supporting base in its entirety, including the sled 106, the power plant and associated equipment, around the spar. With this present arrangement of self contained guy winches the spar will remain in place without change. Only the mainline and haulback line may need rethreading through their respective blocks. With the winches thus located, they hold their corresponding cables in the same relative positions no matter how much the spar itself may be turned on its supporting pivot. This arrangement serves another very desirable purpose in that when the spar is lowered the winches take up all of the slack in their respective guy tackles and hold everything securely in place, thus effecting a very appreciable saving in time when a move is made and then when a new location is reached every unit is complete and ready for immediate use in guying the spar as soon as it is raised. This winch arrangement, therefore, contributes a great deal to the speed and assurance with which this heavy equipment can be taken down and put up and placed in use.

A preferred arrangement of the guy winches is shown in FIGURES 5 and 6, where it will be noted that a plurality of winches is provided on each side of spar 10, and that these are protected and the workmen themselves protected from the winches by the covering and supporting plates, as 36 and 38. In the present showing three winches have been shown on each side of the spar. This has been found to be adequate for the usual installation where top guying only is employed. If intermediate guying should be resorted to in order to keep the weight of the spar within reasonable limits and it should be desirable to have the intermediate guys attached to lugs 39, then additional winches could be employed by merely increasing the number of winches on each side over and above those shown. Each winch is, in effect, complete in itself and employs a line spooling drum 40 of conventional form and having the usual end plates, as 42. As is conventional in hoisting winches, each winch is provided with its own brake drum and brake band, indicated generally at 44 and having the operating lever 46. A preferred form is the band brake of the differential type which is so well known that it has not been illustrated in detail. The operating handle 46 is normally just a stub over which an extension in the form of a pipe is employed when any one drum is to be operated and then the extended handle can be removed as soon as the drum becomes inoperative and is held in its fixed position by dogs, such as 48 and 50. It will be noted in FIGURE 5, particularly, that two forms of dogs are used, depending upon the location of the ratchet wheels 52 or 54. By having one a strut type dog, as 48, and the other a hookover type, as 50, the controls for the same can all be brought out to the same side for convenience in operation.

Each of the various drums is provided with its own friction clutching arrangement, as 60. Here again many forms of clutch engaging means are in common use and the type selected is relatively immaterial. It is material, however, that the control handles, as 62, which may be of a removable type are all brought out the same side, again for convenience in operation.

Following the usual design characteristics of equipment of this order, each of the drums 40 is mounted to revolve freely upon its supporting shaft and the shafts themselves are driven as a unit by a plurality of gearing, indicated generally at 64. There being one set of this gearing for each bank of drums, or in other words, for each side of the spar proper. The two banks are connected together in driving relationship by any suitable means as the link chain 66 and sprockets 68 and 70. Sprockets 68 and 70 are fixedly secured to the driving shafts 72 to which in turn the drive pinions 74 are secured and mounted in driving relationship with the connected intermeshing gearings 64. Shaft 72 is provided with a second sprocket and chain assembly having the sprocket member 76 and the driving chain 77. A coacting sprocket 78 is mounted upon the driven shaft 79.

When power is required as in taking up the guys an external drive motor 80 is employed. This drives shaft 79 and then through sprocket 78 and 76 to shaft 72. The drive is then transferred by chain 66 to the opposite bank of winches so that when motor power is applied at 80 all the various winch shafts are turning and it then becomes only necessary to operate the individual clutch 60 by means of handle 62 so as to drive any selected one or group of winches.

It has not been deemed necessary to fully illustrate the drive means 80. In FIGURE 6 a portable drive is indicated such as is normally provided on the end of a flexible shaft, which may take its power from the bulldozer or other means. It is also to be remembered that in woods work the power head such as is used on chain saws, and the like forms a very excellent source of power for this equipment.

FIGURES 5 and 6 illustrate further the universal joint upon which spar 10 is pivotably mounted. This unit is provided with a universal action by means of the two shafts or pivot pins 82 and 84, each of which provide a hinge action in one plane, so that a true universal joint is provided. The spar is also mounted for revolution about its longitudinal axis and this structure is best illustrated in FIGURE 5, where it will be noted that one part of the universal joint, as 85, is provided with a bearing plate which supports the spar bearing plate 87. Further, member 85 is provided with an axially disposed, that is axially disposed with respect to the spar, pivot pin or bolt 88. This bolt secures the spar base to the universal joint assembly but permits it to rotate on its axis. In FIGURE 2 in full line and in FIGURE 6 in dashed lines, is illustrated the jaw member 90, which supports and secures pin 84 in place during the time the spar is in use. It is necessary to have a release at this point so that the mast can be freed from its supporting base when it is desired to lower the same to its transport position, as is illustrated in FIGURE 2.

When it is desired to lower the spar for transportation to a new yarding site, the guys in front of the equipment, as viewed in FIGURE 1, are slackened off and the spar is revolved to either the position shown in FIGURE 1 or a position 180 degrees from that position in order that one of the rest jaw members 100 may be engaged with the transport rest or fulcrum pin 102 and locked in place by a plurality of pins 103. Pins 103 should be shouldered on one end and have removable locking means on the other end as a cotter pin, or the like. This arrangement is best shown in FIGURE 7. In order to prevent unnecessary revolving of the spar 10, two members 100 are provided, one on each side of the spar and preferably, on the same sides as the cover plates 36 and 38 which house the winches. As noted in FIGURE 2, the dashed line position 104 is the normal position of the spar, consequently it must be eased backward, under control of the guys, until the rest jaw member 100 engages fulcrum pin 102. At this time a heavy cable tackle is secured at one end to the supporting sled 106 and through pulleys 142 on the bottom of spar 10, and then back to the heavy drum of the bulldozer assembly. This is the only positive control element secured to spar 10 for use in the lowering or raising operation of spar 10. This sequency of positions is illustrated in FIGURES 10, 11 and 12 and is the same for raising or lowering of the spar. In its working position spar 10 does not touch any of the maneuvering gear as frame 114 or A frame 108.

Because of the heavy loading and the unfavorable mechanical advantage of having the tackle secured to the short end of the spar with the long end overhanging pin 102, this pivot structure and its supporting means must be very generously proportioned. A suitable means has been provided in having the A frame 108, having the two legs, each of which extend out to the margins of the sled, as at 110 and further, a second A frame 112, which also has two members which extend out to the margins of the frame. This provides a very substantial and fixed support for pin 102. It is noted in the drawings that these members are shown as being pivotably secured to the sled, however, that is a matter of convenience which permits the dis-assembly of the entire unit, as for long distance transportation on other vehicles, and the like.

It has been found desirable that a more favorable positioned mechanical means be provided for applying the power required to lower the spar or to raise it, and this is provided in a third frame arrangement indicated at 114. This frame consists of two substantially parallel members which are pivoted near the longitudinal center of the sled as at 116, one on each side. They are joined together near their upper extent by a transverse beam 118 of considerable length, substantially the equal to the width of the sled and quite heavily reinforced so that in case of a slipping of any of the tackles during the lowering operation, particularly, there will be a substantial support of considerable transverse extent ready to receive the spar. The extra length of beam 118 serves a second purpose in that it permits frame members 114 to be employed in a more nearly vertical position so that they can exert their maximum strength, and here again, suitable webbing is resorted to as 120, so as to give additional strength to this member. In actual operation, however, it is necessary to have the minimum of friction, and to this end there is mounted centrally of beam 118 a pair of spaced rollers or wheels, 122. These wheels ride on the body of spar 10, and are guided thereon by guides 124 and 126, which have an extent to substantially fill the distance between the inside surfaces of the spaced wheels 122. When the loading indicates it desirable guides 124 and 126 may be dispensed with and the wheels 122 may engage the spar edge directly.

In either of the raising or lowering operations, arms 114 are pivoted about pivot 116 by power applied to cable 130 by the drum of the prime mover. Cable 130 passes over a plurality of sheaves at 132 and 134 so that very high mechanical advantage is obtained. This is, of course, necessary because of the preponderance in length of the spar that is overhanging from pivot 102. With the proportions indicated in the beginning of this specification, it has been found desirable to use five sheaves so that by having the dead end of the cable fixed to the moving sheave 132, a mechanical advantage of eleven is thus achieved. This is not an essential relationship but it is given to assist in proportioning the parts of this equipment so that it will be workable and safe.

In either the raising or lowering operation cable 140 passing through block 142 and then to the winch W assists the operation in either raising or lowering, and also tends to seat rest member 100 securely on pin 102 and to maintain it there. It will be understood, it is believed, that in raising the spar, which is merely the reverse of lowering it, it is essential, due to the overhanging preponderance of spar to the left, as viewed in FIGURE 2, that it be in close contact with pin 102. This can be achieved by locking the same or by cable 140 exerting a constant downward pressure, or preferably by both. As cable 130 is reeled in on winch W through the high mechanical advantage it possesses, wheels 122 are walked down the spar and at the same time the spar is raised. This action is carried forward until the spar is almost to the vertical but still inclined backward sufficient so that rest 100 is still engaged on pin 102 and at this time shaft 84 is engaged and locked in opening 90 of the base support member 144. It is at this stage of the operation that the various guys are anchored to their respective stumps S and then the control of the spar passes to the guys.

During the transport stages and as a safety means, during the raising and lowering stage the movable framework 114 is tied to the rather substantial mount for pin 102 by means of one or more heavy arresting cables 150 which limit the outward movement of frame 114 and would continue to maintain this minimum position if through some fault the cable 130 should slacken.

As in my former application referred to, it has been proven most economical to employ the tractor T, after the showing of FIGURE 1, in that it is run up on sled 106 on a suitable platform, as 160, and adds its weight to the sled and gives the structure a high degree of stability. The modern bulldozer has an abundance of power and it is most economical to employ this unit to power the multi-drum winch W, which normally serves to handle the main or haul-in line and the out-haul line during the logging operations. It has a secondary utility in raising and lowering the spar. To provide against raising of the winch under heavy loads, a holddown device is provided at 166, which consists of an anchor to the sled, the member to encircle a substantial part of the main drum of the winch as the central shaft thereof, and take up means as the turnbuckle 168 insures that a snug engagement will be made so that no strain can raise the tractor off of sled 106.

In transporting the spar assembly from one logging position to another, the spar is lowered to the horizontal position indicated in FIGURE 8. Experience has shown, however, that the longer spars tend to overbalance any transport base, as sled 106, of reasonable length. One solution of this problem is to move the spar longitudinally while the tractor T is still in place on the sled. As an abundance of attachment lugs and sheaves are present on the spar or its supporting means, cables run from the spar to one or more of winches W which may be used to move the spar to a point where it balances on the sled. After so moving the spar it is secured in position by, preferably, shaft 102, which may be passed through the lowermost hole 170 in the spar. An auxiliary locking shaft or pin 107a inserted through the holes 107 may be used instead of shaft 102, if desired. In this latter case, the stop lugs 105 will abut against shaft 102 to align pin 107a and holes 107 with the lowermost hole 170.

To reduce the dragging action of the platform, the rear end may have tracks 182, supported on wheels 184, on carriage frame 180. The tractor, hitched to the forward end, will then exert a forward and upward pull on the platform which, together with the rear mobile track unit 182, will at least partially reduce the friction of dragging.

Under certain operational conditions or because of highway regulatory legislation it may be necessary to provide co-acting flanges near the center of spar 10, so it may be taken apart and thus provide two sections. Such flanged means is shown at 172 and 174. These flanges must provide for sufficient bolts to carry the full load imposed on the spar. The spar portions, at the flanged ends, may preferably be re-inforced by a plurality of longitudinally extending webs, as 176.

It is believed that it will be clearly apparent from the above description and the disclosure in the drawings that the invention comprehends a novel construction of a portable logging tower.

Having thus disclosed the invention, I claim:

1. A portable logging tower, comprising: an upright spar member having means for securing guy lines thereto, a rest jaw member on two opposite sides, and having cable block means on its upper portion; a portable base on which the lower end of said spar member is stepped when the same is upright and adapted to receive and support a tractor on its upper surface; a fixed fulcrum member positioned above said base and supported thereby in position to be engaged by said spar member at a point above the lower end of said spar member as the latter is unstepped and moves in an upright plane toward said base in lowering; a rest member having a horizontal beam disposed transversely of and extending for substantially the entire width of said portable base and supported by substantially straight frame member; said frame members pivotally connected to said base and pivotal in a substantially vertical plane from a first position above said fulcrum member to a second position horizontally removed from said fulcrum member, said rest member being disposed to carry said spar member with moving contact in lowering and raising movement between said positions; said base having removable power drum means and tension means connected to said rest member and guidedly led to said drum means with mechanical advantage so that a pulling force can be placed on said rest member to cause said rest member to so carry said spar member in lowering and raising; means operative to hold the spar member selectively to said fulcrum member until said spar member is stepped on said base in raising of the spar member and from the point that said spar member is unstepped from said base in lowering of the spar member; means adapted to use the overhanging preponderance of said spar to lift the rest jaw member off of the fulcrum member when the spar is horizontal; power means for moving said spar in the direction of its base end until the spar is substantially balanced, in a horizontal position over said base.

2. The improvement in a portable logging tower, comprising: a tractor, a base platform in the form of a sled adapted to support said tractor, power drums driven by said tractor; a fulcrum member including a fulcrum pin fixedly supported substantially above said base by a series of legs, a movable support member supported by pivoted straight strut type legs to move in a path of travel above said tractor between a first position at a level substantially the same as said fulcrum pin and a level higher than said fulcrum pin, a tower having an upright position at the end of said tractor, said tower having fulcrum pin engaging means located to engage said pin during at least a portion of the lowering thereof and said movable support member being located in said path of travel to engage said tower above the fulcrum pin engaging means during at least a portion of the lowering thereof, tension means leading to a power drum on said tractor, for holding said tower to said fulcrum pin during the period of raising and lowering said tower, and capable of being slacked off to disengage said fulcrum pin from said tower fulcrum engaging means, and tension means between the power drums of said tractor and said movable support member when said member is in supporting relationship to said tower during a portion of the lowering and raising thereof; said movable support member supported from said base platform including a horizontal supporting beam having a length substantially equal to the width of said base platform and said movable support member including a rotary member, centrally positioned longitudinally of said beam, adapted to engage said tower, the beam being located to catch and support said tower should it lose contact with said rotary member.

3. A portable logging tower, comprising: a platform, a tower having rest jaw members on two opposite sides supported on said platform having a height comparable to the usual spar tree, a fulcrum member having a fulcrum shaft disposed to engage said rest jaw members and a support member disposed above and pivotably supported from said platform and supporting said tower in horizontal position above said platform when lowered by pivoting over said fulcrum member, said fulcrum member having locking hole means and a securing pin engageable with said means in said tower adjacent the fulcrum shaft, to fasten said tower to said fulcrum member against upward movement in the area of abutment, a second securing hole means for said securing pin located on said tower at a point between said fulcrum hole member and said support member when said tower is initially lowered, and cable means and support means for the cable means adapted to be powered by a tractor on said platform to drag said tower from the position of said tower, when initially lowered, endwise toward said fulcrum member until said second securing hole means between said tower top and fulcrum member are aligned with said locking hole means for engagement; and outstanding stop lugs secured to the opposite faces of said tower which have rest jaw members secured thereto, adapted to limit the longitudinal movement of said tower by engaging said fulcrum pin and thus align the second securing hole means with said locking hole means for engagement.

References Cited in the file of this patent
UNITED STATES PATENTS
984,230    Miller et al. _____ Feb. 14, 1911
(Other references on following page)

UNITED STATES PATENTS

| Number | Name | Date |
|---|---|---|
| 1,031,075 | Lundin | July 2, 1912 |
| 1,975,555 | Presley | Oct. 2, 1934 |
| 2,071,694 | Howe | Feb. 23, 1937 |
| 2,212,068 | Humphreys | Aug. 20, 1940 |
| 2,271,578 | Woolslayer et al. | Feb. 3, 1942 |
| 2,493,687 | Mott | Jan. 3, 1950 |
| 2,502,108 | Taylor | Mar. 28, 1950 |
| 2,557,192 | Leister | June 19, 1951 |
| 2,582,548 | Larson | Jan. 15, 1952 |
| 2,611,580 | Troche et al. | Sept. 23, 1952 |
| 2,628,071 | Williams | Feb. 10, 1953 |
| 2,680,525 | Weatherby | June 8, 1954 |
| 2,694,474 | Meany | Nov. 16, 1954 |
| 2,790,622 | Priest | Apr. 30, 1957 |